No. 705,190. Patented July 22, 1902.
G. J. ALEXANDER.
COMBINED BADGE AND BOUQUET HOLDING BUTTON.
(Application filed May 20, 1902.)
(No Model.)
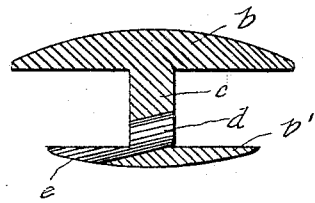
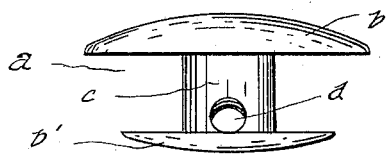
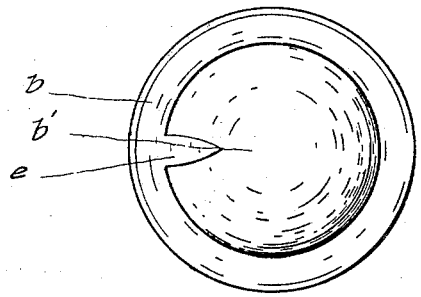
WITNESSES:
INVENTOR.
BY
ATTORNEY.

UNITED STATES PATENT OFFICE.

GEORGE J. ALEXANDER, OF PHILADELPHIA, PENNSYLVANIA.

COMBINED BADGE AND BOUQUET-HOLDING BUTTON.

SPECIFICATION forming part of Letters Patent No. 705,190, dated July 22, 1902.

Application filed May 20, 1902. Serial No. 108,181. (No model.)

*To all whom it may concern:*

Be it known that I, GEORGE J. ALEXANDER, a citizen of the United States, residing at No. 723 North Twenty-sixth street, Philadelphia, in the county of Philadelphia and State of Pennsylvania, have invented certain new and useful Improvements in a Combined Badge and Bouquet-Holding Button, of which the following is a specification.

My invention relates to improvements in badge-buttons in which two heads are connected by a shank, one head of which may be engraved or enameled with the insignia of some order or society and the other head designed to hold the first in position in the buttonhole of the lapel of a coat; and my improvement consists in combining with the aforesaid type of badge or button such construction as will enable it to act as a receptacle or holder for a flower or small boutonnière. I attain this object in the manner shown in the accompanying drawings, in which—

Figure 1 is a sectional view showing my improvements. Fig. 2 is a bottom view showing the notched head $b'$, and Fig. 3 is a view looking into the opening or hole $d$.

Similar letters refer to similar parts throughout the views.

My invention consists of a button or badge $a$, having two heads $b\ b'$, connected by a shank $c$, more or less oblong in cross-section, said shank $c$ having an inclined hole or opening $d$ for the reception of the stem of the flower. The head $b'$, which is designed to be inserted in the buttonhole, is radially notched at $e$, Fig. 2, in continuation of the bore of said opening $d$. This notch $e$ is an important part of my invention, it permitting the flower being worn without material disturbance to the shape of the buttonhole and preventing the breaking of the flower-stem, (usually very fragile,) which would be the case were it exposed to the edge of the head $b'$ or simply passed through and held in the shank $c$. The flower is thus held firmly, and lateral movement in the shank $c$ is prevented.

In using the badge or button as a bouquet-holder it is first inserted in the buttonhole and the flower-stem pushed through the buttonhole into opening in shank $c$ and then into notch $e$, which holds the stem firmly in position.

Having thus described my invention, I claim—

1. A combined badge and bouquet-holding button, comprising a shank provided with an opening for the reception of a flower-stem and two heads connected with the shank, substantially as described.

2. A combined badge and bouquet-holding button, comprising a shank oblong in cross-section to properly hold it in a buttonhole, and provided with an opening for the reception of a flower-stem, and having two heads connected with the shank, whereof one is radially notched in continuation of the bore of said opening to accommodate the flower-stem, substantially as described.

3. A combined badge and bouquet-holding button, comprising a shank oblong in cross-section to properly hold it in a buttonhole, and provided with an inclined opening for the reception of a flower-stem and for properly positioning the flower, and two heads connected with the shank, whereof one is radially notched in continuation of the bore of said opening to accommodate the flower-stem, substantially as described.

In testimony whereof I affix my signature in presence of two witnesses.

GEORGE J. ALEXANDER.

Witnesses:
 HERVEY J. SHERER,
 HEPNER F. VAN HORN.